United States Patent Office 3,523,989
Patented Aug. 11, 1970

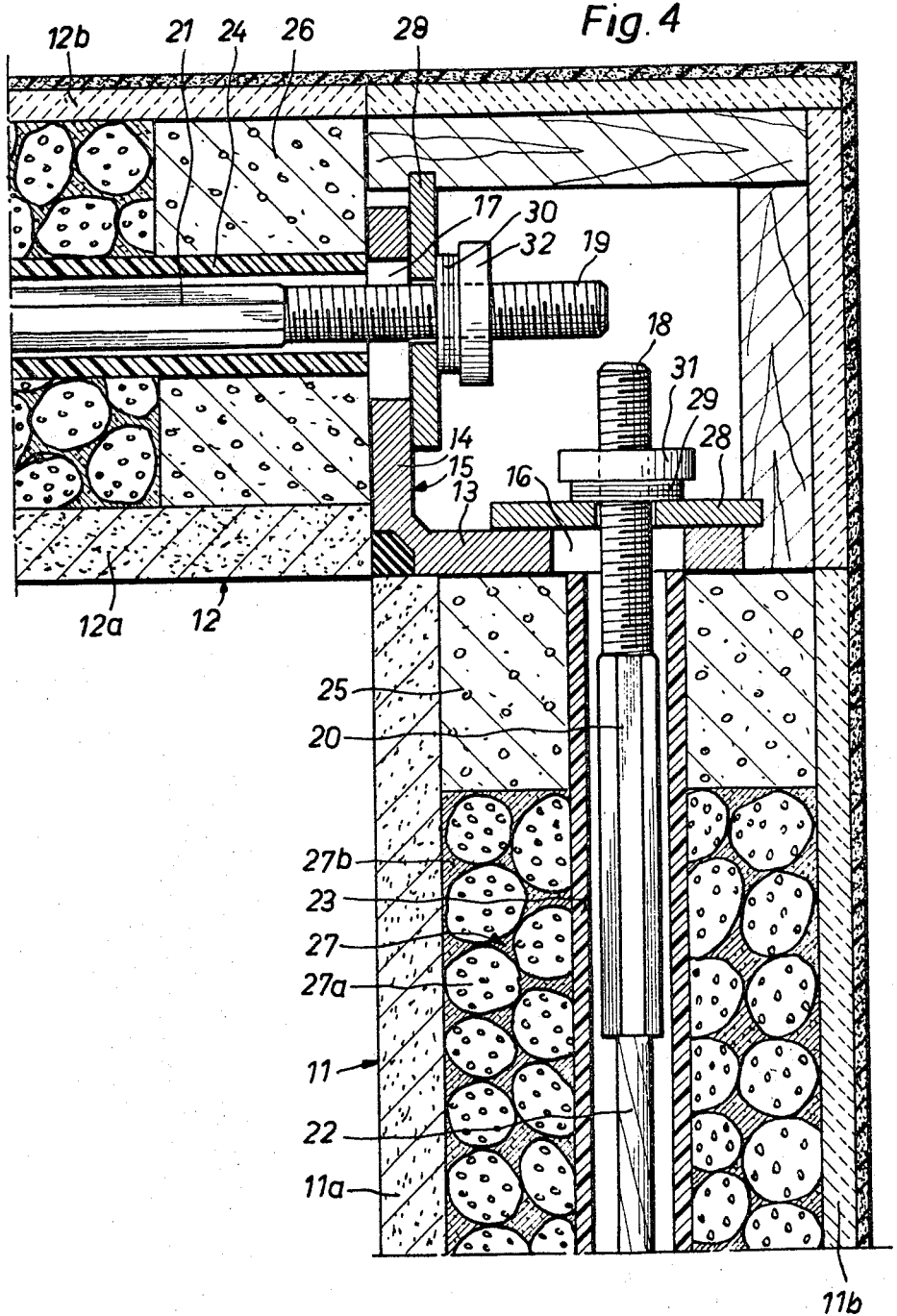

3,523,989
METHOD OF PRODUCING STRUCTURAL WALL OR CEILING ELEMENTS COMPRISING RIGID FOAMED MATERIAL AND FILLERS
Albin Murer, Beckenried, Nidwalden, Switzerland
Filed Oct. 3, 1967, Ser. No. 672,490
Claims priority, application Switzerland, Oct. 3, 1966,
14,242/66
Int. Cl. B29d 9/00
U.S. Cl. 264—45     7 Claims

ABSTRACT OF THE DISCLOSURE

The method of producing molded wall and ceiling elements comprises preparing a mold by horizontally positioning an outer plate, consisting for example of plaster, arranging a mold frame about the outer edges of said plate, introducing light weight filler material, for example expanded clay, into the mold, casting a foamable resin such as polyurethane resin over the filler material in the mold, closing the mold by a second outer plate consisting for example of asbestos, placing the mold in a press, heating the contents of the mold while under pressure to effect foaming of the resin material and subsequently curing the foamed material. The frame members placed around said outer plate to form a mold may remain a permanent component of the structural elements to be produced.

---

This invention relates to a method for producing building elements, such as wall or ceiling elements comprising foamed plastic materials and fillers.

The object of the invention is the provision of an efficient method for producing light-weight, moisture proof building elements of high strength and excellent sound and heat insulating properties.

According to the invention this method comprises placing a first outer plate in substantially horizontal position, placing a boundary frame along the periphery of the plate to provide a mould, said frame having a height corresponding substantially to the thickness of the element to be produced, introducing filler bodies into the mould formed by said outer plate and boundary frame, said filler bodies being evenly distributed over said outer plate up to a height not exceeding the height of said boundary frame, casting and uniformly distributing a foamable resin on the filler bodies in the mould, closing the mould by placing a second outer plate on said boundary frame in a position parallel to said first outer plate, and placing the closed mould under pressure during foaming of the cast resin and curing of the foamed resin.

Foaming the cast resin and curing preferably will be effected under pressure by introducing the filled mould between horizontal pressure plates of a press.

The invention will now be described with reference to the accompanying drawings showing several embodiments of wall or ceiling elements produced by the method according to the present invention.

Figure 1:
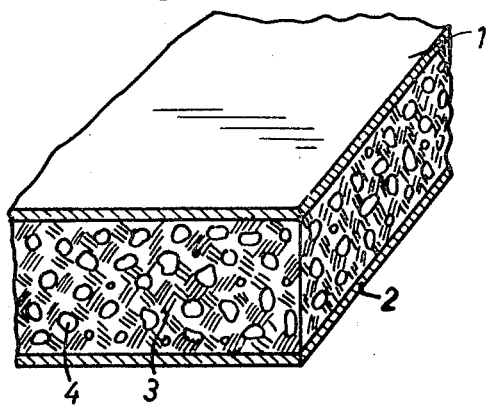
Figure 2:
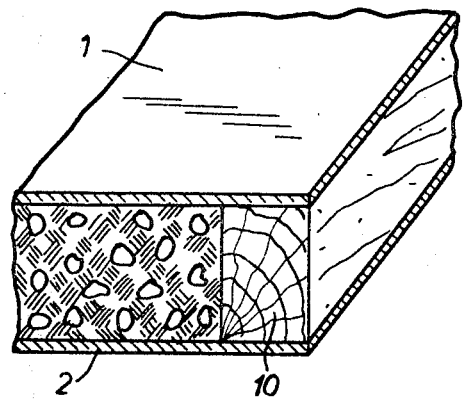
Figure 3:
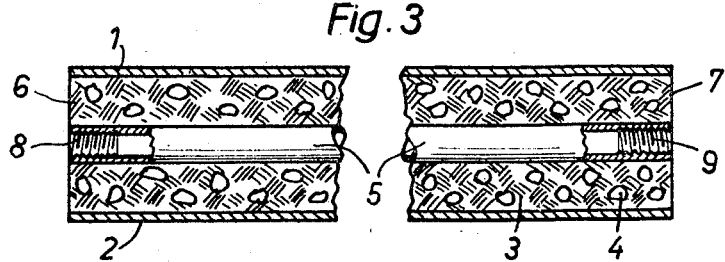

FIG. 1 is a fragmentary perspective view of a wall or ceiling element in its most simple form, FIG. 2 is a fragmentary perspective view of a wall or ceiling element having an inserted boundary frame, FIG. 3 is a sectional view of a structural element having an inserted tube which serves for the purpose of mounting the element, FIG. 4 represents the manner of mounting wall elements having cast-in tubes by means of pre-stressed cables.

The wall or ceiling element represented in FIG. 1 comprises an upper, outer plate 1 which can be formed by example of asbestos and a lower outer plate 2, preferably consisting of plaster. The core 3 of the element between the two outer plates comprises rigid foam material, preferably polyurethane foam, and substantially ball-shaped filler material 4. This filler material must have sufficient strength in view of the method of production of the elements and a dense surface, so as to prevent any penetration of the liquid cast resin into the filler material during the production of the elements. The filler material 4 should have a low specific gravity so that the total weight of the elements will remain low. Filling material having the required properties are for example granular bodies of expanded clay, known under the trade name "Lecca" stones, polystyrene balls or glass gall.

In the structural element represented in FIG. 2, a beam 10, preferably of wood, is provided along one side of the element between the top and bottom plates 1 and 2. This beam 10 can form a part of a mould frame for the production of the element and in the finished element it can serve for receiving fixing members for securing the elements to each other or to supporting structures.

FIG. 3 represents a structural element of the type shown in FIG. 1, into which a tube 5 is inserted, which extends from one end face of the element to other end face. The two ends of the tube can be threaded, particularly they can be provided with an internal thread, so that the element can be easily secured in position by screws.

For the production of such elements, the lower outer plate 2, for example, is placed on the lower horizontal pressure plate of a press, not shown, or on a carriage which later can be moved into a press. The lower outer plate placed on the pressure plate in provided with a boundary frame along its edges, this frame having a sufficient height that the cast resin and the filler to be filled in cannot overflow. The boundary frame can extend along the edge of the plate 2 completely on the outside thereof, or it can be placed partly or entirely within the edge of the plate, or the frame can be made up of two separable inner and outer sections, the frame or frame portions situated within the edges of the plate 2 forming a part of the finished element.

When the boundary frame has been placed on or around the bottom plate 2 to form a mould closed all around the plate, the desired amount of filler bodies 4 are brought into the mould and uniformly distributed therein. Filler bodies can be filled-in until they reach the upper edge of the frame.

A thermosetting resin suitable for the production of rigid foam is now uniformly distributed over the filler bodies 4 on the plate 2, and then the upper plate 1 can be placed on the frame in a position parallel to the lower plate 2. As a rule, special steps have to be taken that no air cushion will remain between the top plate 1 and the foamed resin after it has hardened, so that the plate may become distorted. For this purpose the top plate 1 will be placed in position on the upper edge of the boundary frame only when the foam forming from the filled-in cast resin has completely filled the space provided between the two plates 1 and 2 limited by the frame. By insertion of spacing means between the top edge of the frame 10 and the plate 1 it will be obtained that all the air between the foam and the upper plate 1 can escape. The spacing members can then be removed so that the top plate rests on the frame. The filled mould is then introduced into the press where the further foaming and curing of the cast resin takes place under pressure.

In order to remove air from the interior of the mould during the production of the elements, perforated flexible tubes or hose can be placed on the filler bodies in the mould and carried outside through the mould frame; after placing the top plate 1 on the frame, any air still present in the mould can be drawn out through these tubes or hose. Suction effected at a vacuum of about 200 torr will be sufficient for removing any entrapped air. For effecting a uniform distribution of the cast resin above and between the filler bodies 4 in the mould, the liquid resin is introduced by means of a nozzle arrangement which can be moved to-and-fro along a zigzag path or a spiral path from the centre of the mould outwardly above the lower plate 2 on which the filler bodies are placed.

The cast resin which, for foaming and curing comprises several components, is in part pre-mixed, and in part its components are mixed in the nozzle arrangement moving above the filler bodies. Two main components of the resin mixture are introduced into the nozzle arrangement. One of the main components consists of a mixture of "Polyol," which is a polyalcohol and "Frigen" which is a chlorofluoro alkane also known as "Freon," while the other main component is a mixture of isocyanate and "Frigen." In the first component three parts by volume of "Polyol" are mixed with one part by volume of "Frigen," and in the second main components ten parts by volume of an isocyanate are mixed with one part by volume of "Frigen." Even parts by volume of the two main components are mixed with each other in the nozzle arrangement.

A cast resin mixture of the above type, resulting in a polyurethane rigid foam, is foaming by developing heat and subsequently hardens. Curing takes place in the press at a pressure of 3 to 4 atmospheres in excess of atmospheric pressure during a time of less than one hour. For stabilization, the produced structural elements are then removed from the press and subsequently stored for several hours under lower pressure at room temperature and normal atmospheric humidity.

For acceleration and simplification of the process of manufacture, it will be advantageous to cool the casting resin, prior to filling it into the mould, to about 0° C. After filling-in the cooled resin, placing the suction tubes over the filler bodies and the upper plate 1 on the frame, the air contained in the mould is extracted as completely as possible. Owing to the cooling of the resin before filling the mould, it is obtained that foaming does not start too quickly and that the foam does not flow over the mould frame before the mould is closed. However, in order not to wait too long until foaming will begin, and curing will be completed, which requires a temperature of more than 100° C. heat is supplied to the mould after it has been closed. This may be effected preferably by dielectric high frequency heating in a high frequency field. In this manner it can be obtained that in a relatively short period a great amount of heat is produced in the cast resin 3 and filler bodies 4 without any substantial loss of heat by the outer plates 1 and 2. After curing of the foam which is rapidly obtained owing to this generation of heat, the moulds with the finished elements can be brought into a conditioned atmosphere for stabilisation.

In order to secure a solid bond between the outer plates 1 and 2 and the core of the structural element, the internal faces of the plates can be coated with a suitable adhesive which ensures a safe bonding with the cast resin as well as with the frame members 10 or other lateral boundary members.

For effecting the high frequency heating of the structural element during its production the pressure plates of the press can serve as condenser plates for generating the high frequency field.

For avoiding any danger of fire with wall and ceiling elements using polystyrene balls as filler, these balls can be coated with a layer of flame proof material.

FIG. 4 shows an edge joint of two wall elements having tubes cast-in during their production for receiving tensioning cables. When using conventional connecting means, such as screws, clamps and the like, it has been found to be difficult to obtain uniform narrow joint gaps at the junction of adjacent elements. Also, the width of the gaps changes due to shrinking or expansion of the elements upon a change of temperature or humidity of the exterior atmosphere or of the air in the interior rooms. By using means for interconnecting the elements shown in FIG. 4, the mentioned inconveniences can be avoided.

FIG. 4 is a horizontal section on the level of the connection means of the elements 11 and 12 at a corner of a wall. These elements comprise the outer plates 11a and 11b and a core 27 of filler bodies 27a and foamed resin 27b. An angle iron 15 has its two webs 13 and 13 screwed to the end faces of the elements by screws not shown. The two webs are provided with drilled or punched holes 16 and 17 through which penetrate screw holts 18 and 19 integral with cable end members 20 and 21. These end members are made of malleable steel of high tenacity and are provided each with a longitudinal bore extending from the rear end of the member until close to the beginning of the threaded portion.

A cable end 22 is inserted in each of the two cable end members 20 and 21 and is secured in the bore by hammer forging, rolling or pressing the members 20 and 21, so that the clamping force holding the cable in the members 20 or 21 even is greater than the tensile strength of the cables. The opposite ends of the cables, not shown, are also provided in similar manner with cable and members to cooperate with the opposite end faces of the elements.

The cables 22 and the inner portion of the cable end members 20 and 21 are situated in the interior of tubes 23, 24 of plastic material, preferably of polyethylene. The ends of the tubes are embedded in end members 25 and 26 of the elements, which consist of synthetic resin concrete, such as a mixture of quartz sand as filler and a polyester resin. The tubes are tightly surrounded by the core material 27 of the elements, formed by the expanded clay stones 27a and the foamed resin 27b, so that they are firmly held by friction against rotation and axial displacement.

The holes 16, 17 in the two webs 13 and 14 of the angle iron have a considerable larger diameter than the screw holts, preferably their diameter is about 2.5 times the diameter of the bolts. This results in a great clearance for a precise relative alignment of the two wall elements to be joined. The great diameter of the holes requires the use of solid washers 28 as bearing support for a plurality of plate springs 29, 30 and nuts 31 and 32, by means of which the cables can be pretensioned. The plate springs 29, 30 are formed by commercially available, hardened steel discs of frusto-conical shape when not tensioned, which discs when axially stressed are deformed into a flat disc. In the joint illustrated in FIG. 4 four plate springs are used on both sides of the two bolts. The number of plate springs used depends on the length of the wall elements to be held together by the cables, or on the number of joints of a wall. The tensioning of the cables in the example shown is effected by means of an axial force of 3 tons which are applied by tightening the nuts with a torque metering spanner or wrench, or by using calibrated plate springs which require just the desired axial force for compressing them to flat condition. The vertical joints between successive elements not shown in the drawing are sealed by means of a permanently resilient sealing cement or mastic comprising silicon rubber or "Thiokol." The joints as well as the entire wall formed by the elements accordingly are continuously placed under pre-tension, whereby the strength of the wall structure is increased.

The production of the wall elements shown in FIG. 4 is effected as described above with reference to FIG. 1 or 2, but additionally the tubes 23, 24 for receiving the tensioning cables are to be inserted. Means have to be provided for ensuring a straight position of the tubes and preventing any deformation of the tubes due to pressure forming during foaming of the cast resin. For this purpose a smooth steel bar is inserted into the tube of plastic material. The ends of the tube reinforced by the steel bar are inserted into corresponding cylindrical holes in a frame member of the mould and accordingly held in place during the moulding of the element. Due to the pressure forming upon foaming of the cast resin the mould filling presses with a considerable force from all sides against the tube on the steel core and firmly secures the tube, after the cast resin has hardened, against axial displacement and twisting. When the hardening is completed, the steel bar can be pulled out of the tube. Removing of the steel bar is facilitated when before insertion a lubricant in liquid or powder form is applied to the bar surface.

When producing the described wall and ceiling elements, it is possible to place electrical or plumbing and sanitary fittings into the mould and have them incorporated in the element by the casting operation, such as electrical sockets, switch boxes and the like, or dowels, hooks and other fixing elements. Deformable hollow bodies would have to be supported in their interior by corresponding cores. The fastening of such elements which are to be built-in, during the casting operation and the hardening period can be conveniently obtained by spacing elements supported by the outer plates 1, 2 and/or by the frame members, such spacing elements may consist of foamed material. Tubes of the same type as used for receiving the tensioning cables can also be provided for receiving electric conductors or gas and water conduits. Considerable saving of cost is possible by providing the fittings in the described manner when producing the elements, by comparison with the expenditure required when applying such fittings only after erection of the walls.

I claim:

1. A method of producing wall and ceiling elements, said method comprising placing a bottom plate in substantially horizontal position, placing a boundary frame along the periphery of the plate to provide a mold, said frame having a height corresponding substantially to the thickness of the element to be produced, introducing a filler body selected from the group consisting of; granular bodies of expanded clay, polystyrene balls or glass gall into the mold formed by said bottom plate and boundary frame, said filler body being evenly distributed over said bottom plate up to a height not exceeding the height of said boundary frame, casting and uniformly distributing a foamable resin which is a polyurethane on the filler body in the mold, closing the mold by placing a top plate on said boundary frame in a position parallel to said bottom plate, and placing the closed mold under pressure during foaming of the cast resin and curing of the foamed resin, whereby said top and bottom plates will be permanently bonded with the cured resin.

2. A method according to claim 1, wherein prior to introducing the filler body into the mold, electrical and sanitary or plumbing fittings and tubes for receiving electric cables and/or sanitary piping are built into the mold and fixed to the top plate or the boundary frame, said tubes being perforated along their entire length to let air out of the cavity of the mold.

3. A method according to claim 1, wherein perforated suction tubes are placed on the filler body and are passed out of the mold through the boundary frame before the top plate is placed on the boundary frame.

4. A method according to claim 2, wherein after the top plate is placed on said boundary frame, the air entrapped in the mold is removed by suction means in communication with said perforated tubes.

5. A method according to claim 3, wherein after the top plate is placed on said boundary frame, the air entrapped in the mold is removed by suction means in communication with said perforated tubes.

6. A method according to claim 1, wherein the placing of the top plate on the boundary frame is effected only after the foam formed from the cast resin has reached a level in the mold corresponding to the final distance between the two plates, thereby avoiding entrapment of air bubbles in the mold.

7. A method according to claim 6 comprising placing spacing members on the upper edge of the boundary frame for supporting the top plate and defining a clearance between the top of the frame and the top plate, said spacing members being removed when sufficient foam has formed to reach said level in the mold.

References Cited

UNITED STATES PATENTS

| | | | |
|---|---|---|---|
| 2,975,488 | 3/1961 | Brauner | 264—45 |
| 3,276,900 | 10/1966 | Funck | 156—79 XR |
| 3,159,694 | 12/1964 | Wiles et al. | 264—102 XR |
| 3,270,122 | 8/1966 | Binek | 156—79 |

JULIUS FROME, Primary Examiner

L. GARRETT, Assistant Examiner

U.S. Cl. X.R.

264—54